United States Patent
Perrotton et al.

(10) Patent No.: US 9,767,334 B2
(45) Date of Patent: Sep. 19, 2017

(54) DEVICE FOR READING AN IDENTIFICATION CODE ON A RUNNING GLASS SHEET

(71) Applicant: SAINT-GOBAIN GLASS FRANCE, Courbevoie (FR)

(72) Inventors: Cédric Perrotton, Paris (FR); Nathanael Brocard, Compiegne (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 15/117,787

(22) PCT Filed: Dec. 19, 2014

(86) PCT No.: PCT/FR2014/053482
§ 371 (c)(1),
(2) Date: Aug. 10, 2016

(87) PCT Pub. No.: WO2015/121550
PCT Pub. Date: Aug. 20, 2015

(65) Prior Publication Data
US 2017/0024593 A1    Jan. 26, 2017

(30) Foreign Application Priority Data
Feb. 11, 2014  (FR) .................... 14 51030

(51) Int. Cl.
*G06K 7/10* (2006.01)
*G06K 7/14* (2006.01)

(52) U.S. Cl.
CPC ..... *G06K 7/10732* (2013.01); *G06K 7/10722* (2013.01); *G06K 7/10792* (2013.01);
(Continued)

(58) Field of Classification Search
CPC .. G06K 7/10; G06K 5/00; G06K 7/14; G06K 15/12; G03B 7/08; G06F 17/00
(Continued)

(56) References Cited

U.S. PATENT DOCUMENTS 8,118,225 B2   2/2012   Redmann et al.
2001/0000010 A1   3/2001   Okamoto
(Continued)

OTHER PUBLICATIONS

International Search Report as issued in International Patent Application No. PCT/FR2014/053482, dated Apr. 15, 2015.
(Continued)

*Primary Examiner* — Edwyn Labaze
(74) *Attorney, Agent, or Firm* — Pillsbury Winthrop Shaw Pittman LLP

(57) ABSTRACT

The device includes an illumination; a camera configured to acquire at least one image of at least one portion of a symbol, the running substrate being illuminated by the illumination; and a processor connected to the camera and configured to be suitable for implementing an image-processing step in which the acquired image is processed by the processor and decoded. The camera used is linear and the illumination is a dark field illumination. Furthermore, the device is configured to carry out, prior to the processor processing step, a plurality of image acquisitions with the linear camera of various portions of the symbol.

20 Claims, 3 Drawing Sheets

(52) U.S. Cl.
CPC ......... *G06K 7/1404* (2013.01); *G06K 7/1413* (2013.01); *G06K 7/1417* (2013.01)

(58) Field of Classification Search
USPC .......... 235/462.11, 462.24, 462.41, 375, 454
See application file for complete search history.

(56) References Cited

U.S. PATENT DOCUMENTS

| | | | |
|---|---|---|---|
| 2003/0024989 A1* | 2/2003 | Aizawa .............. | G06K 7/10653 235/462.36 |
| 2004/0206819 A1 | 10/2004 | Okada et al. | |
| 2005/0168729 A1* | 8/2005 | Jung .................. | G01N 21/8806 356/237.2 |
| 2006/0131419 A1 | 6/2006 | Nunnink | |
| 2008/0050842 A1* | 2/2008 | Golovlev ......... | G01N 33/54346 436/525 |
| 2011/0108627 A1* | 5/2011 | Bathelet ............. | G06K 7/10732 235/454 |
| 2012/0061470 A1* | 3/2012 | Marguerettaz ... | G06K 19/06046 235/454 |
| 2012/0127480 A1* | 5/2012 | Pilloud .................... | B31B 1/74 356/511 |
| 2014/0152808 A1* | 6/2014 | Ullrich ................ | G01N 21/896 348/131 |

OTHER PUBLICATIONS

International Preliminary Report on Patentability and the Written Opinion of the International Searching Authority as issued in International Patent Application No. PCT/FR2014/053482, dated Aug. 16, 2016.

* cited by examiner

DEVICE FOR READING AN IDENTIFICATION CODE ON A RUNNING GLASS SHEET

CROSS-REFERENCE TO RELATED APPLICATIONS

This application is the U.S. National Stage of PCT/FR2014/053482, filed Dec. 19, 2014, which in turn claims priority to French Application No. 1451030, filed Feb. 11, 2014. The contents of all of these applications are incorporated herein by reference in their entirety.

The present invention relates to the field of identification codes marked on individual glass sheets or on glass sheets integrated into a glazing product.

It is possible to use one-dimensional "barcode" type symbols or analogous symbols and two-dimensional "Data Matrix" type symbols or analogous symbols as codes for identification of glass panels.

These codes may contain any type of information such as, for example, a number serving to identify the substrate. Information such as the manufacturing site or the time and date of manufacture may also be integrated, as well as information of any other suitable type.

The symbols are for example marked by means of a laser beam of any suitable type, preferably oriented perpendicularly to the glass sheet, i.e. to the general plane of the glass sheet. Specifically, the symbols thus marked are generally intended to be read from in front by positioning a device facing the symbol, and therefore facing one of the two main faces of the glass sheet.

US 2001/000010, US 2004/0206819 and US 2006/0131419 describe devices for reading codes on glass with dark field illumination.

However, these devices require at least one two-dimensional image (i.e. containing a plurality of rows of pixels) of the entirety of the code to be taken. In the case of uncertainty regarding the position of the code and/or in the case where the glass is running rapidly, it is then necessary to carry out a plurality of image captures. Analysis of these various images requires a substantial amount of processing time, this in general not being compatible with high substrate run speeds.

Furthermore, there is a risk that the code will be shifted relative to an optimal illumination position and that the illumination will thus not be uniform in the acquired image. There is also a risk that the contrast will not be high enough for the image to be reliably processed and decoded.

U.S. Pat. No. 8,118,225 proposes a particular illuminating device with codes containing metal particles to improve contrast. However, it has the same drawbacks in the case of uncertainty regarding the position of the symbol when a code is read on the run.

It is therefore difficult to adapt such devices to industrial lines.

One aim of the invention is to provide a reading device allowing codes marked on running glass to be rapidly read despite an uncertainty in the position of the codes and/or a high run speed.

One aspect of the invention relates to a device for reading a symbol forming a code marked on one face of a substrate comprising a glass sheet, the substrate being on the run, the device comprising:
an illumination;
a camera configured to acquire at least one image of at least one portion of the symbol, the running substrate being illuminated by the illumination; and
a processor connected to the camera and configured to be suitable for implementing an image-processing step in which the acquired image is processed by the processor and decoded;
in which the camera used is linear and the illumination is a dark field illumination, and in which the device is configured to carry out, prior to the processor processing step, a plurality of image acquisitions with the linear camera of various portions of the symbol.

The use of a linear camera and a dark field makes it possible to obtain a uniform illumination of the code and to tolerate an uncertainty in the position of the code, and makes it possible to carry out image acquisitions, and processing and decoding of these images, at high run speeds ranging up to 90 m/min.

Furthermore, this device allows a code to be read even if the glass is flipped, i.e. with a substantial depth of field obtained by virtue of the better contrast of the acquired images.

The device makes it possible to use an illumination of small footprint. The illumination may thus be placed between two rollers of a conveyor the rollers of which are for example spaced apart by less than 400 mm, or even by less than 200 or even 100 mm.

Particular embodiments of the device may furthermore comprise one or more of the following features or one or more technically feasible combinations of the following features:
the illumination comprises two illuminating zones and a dark zone between the two illuminating zones, the linear camera observing in the direction of the dark zone;
the dark zone is obtained by masking a zone illuminated by the illumination;
the illumination comprises a light source and a scattering element so as to produce a diffuse light;
the illuminating plane is perpendicular to the optical axis of the camera;
the camera and the illumination are placed on either side of the substrate, the substrate being transparent;
the camera and the illumination are placed on the same side of the substrate, the substrate having a specular surface;
the device comprises an apparatus for measuring the movement of the substrate, the device being configured so that the acquisition of the images of the substrate by the linear camera is triggered depending on the measured movement;
the symbol may be read and decoded in a position ranging from 0 mm to 10 mm from the focal plane of the camera;
the field of view of the camera is not parallel to and is preferably perpendicular to the run direction of the substrate; and
the width of the field of view of the camera is at least 30 mm.

According to another aspect, the invention relates to a method for reading a symbol forming a code marked on one face of a substrate comprising a glass sheet, the substrate being on the run, the method comprising:
at least one acquisition, with a camera, of an image of at least one portion of the symbol, the running substrate being illuminated by an illumination; and
an image-processing step in which the acquired image is processed by a processor and decoded;
in which the camera used is linear and the illumination is a dark field illumination and, prior to the processing step, a plurality of acquisitions of images of various portions of the symbol are carried out with the linear camera.

Preferably, the reading device used in the method is such as described above.

The invention will be better understood on reading the following description, given merely by way of illustrative example, which refers to the appended drawings, in which.

Figure 1:
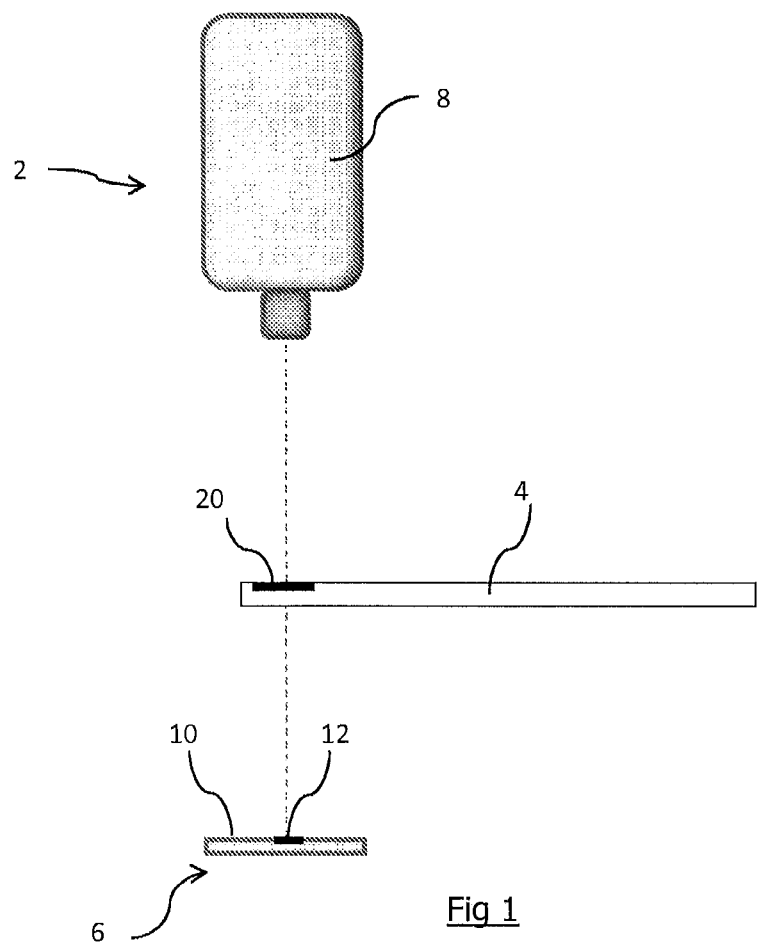
FIG. 1 shows a schematic view of an example device for reading an identification code on a glass sheet, according to one embodiment of the invention.

The device 2 in FIG. 1 is installed in an industrial installation through which glass sheets 4 run, for example on a conveyor.

The reading device 2 is installed on the line, for example level with a conveyor.

It comprises an illumination 6, a camera 8 and an image-processing processor (not shown) connected to the camera.

In this embodiment, the illumination and the camera are placed on either side of the substrate 4 so as to obtain an illumination in transmission.

It is essential for the illumination to be a dark field (i.e. indirect) illumination and for the camera to be linear (i.e. contain a single row of pixels).

The expression "dark field illumination" is understood to mean an indirect illumination, i.e. an illumination that is not orientated directly toward the objective of the camera so that the camera observes a dark zone. However, the corresponding dark zone on the glass sheet is passed through by light that would not normally reach the camera directly in the absence of a scattering element illuminating this dark zone of the glass sheet i.e. the code observed is "white (or luminous) on a dark background", hence the name "dark field".

To form the dark field illumination, the illumination thus comprises a light source (not shown), for example obtained by means of LEDs placed in a line, and preferably a scattering plate 10 placed between the light source and the substrate, in order to produce a diffuse light.

Figure 2:
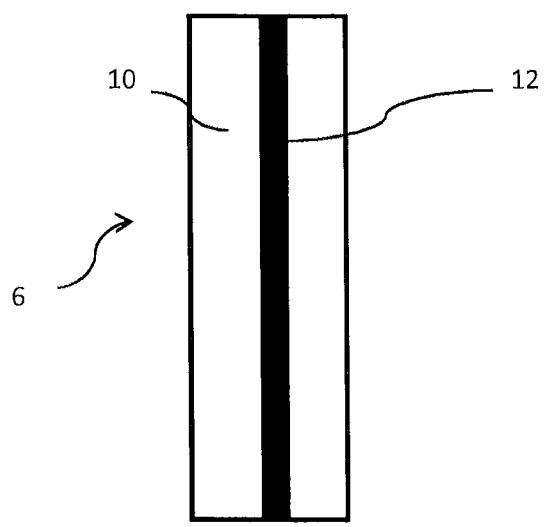
FIG. 2 is a front view of the illumination in FIG. 1, such as seen by the camera.

A mask 12 (see FIGS. 1 and 2) is for example placed on the scattering plate 10 in order to mask a portion of the illuminating zone of the scattering plate and thus to form the dark zone. It is thus a question of a portion of the plate toward which the field of observation of the camera is orientated. Preferably, the optical axis of the camera is centered on the middle of the dark zone.

The aim is to have the camera observing a dark zone of the illumination, between two closely spaced illuminating zones.

Generally, the mask is of any type suitable for producing a dark zone between two illuminating zones from a single illuminating zone. More particularly, the mask preferably takes the form of a strip parallel to the two illuminating zones, which themselves form two illuminating strips.

The dark zone is preferably wider than the field of observation of the camera, so that the edges of the observed image are well into the dark zone. In the illustrated example, the dark zone corresponds to 2 to three observation-field widths, but, as a variant, the dark zone may be of any suitable width.

The dark zone for example has a width of 5 mm or less.

As a variant, the dark zone is produced by any suitable means and likewise the illuminating zones.

It is for example a question, as a variant, of two scattering illuminating plates spaced apart to form between them said dark zone that the camera must observe.

As another variant, the illumination does not comprise a scattering plate but simply strips of LEDs. However, this variant is less preferable because the illumination is less uniform.

Thus, to summarize, generally, the illumination is a dark field illumination of any suitable type.

More preferably, the two illuminating zones produce a diffuse and preferably uniform illumination, for example produced by means of a scattering object between the light source and the glass sheet.

In transmission, the camera observes the dark zone through the glass sheet.

Figure 3:
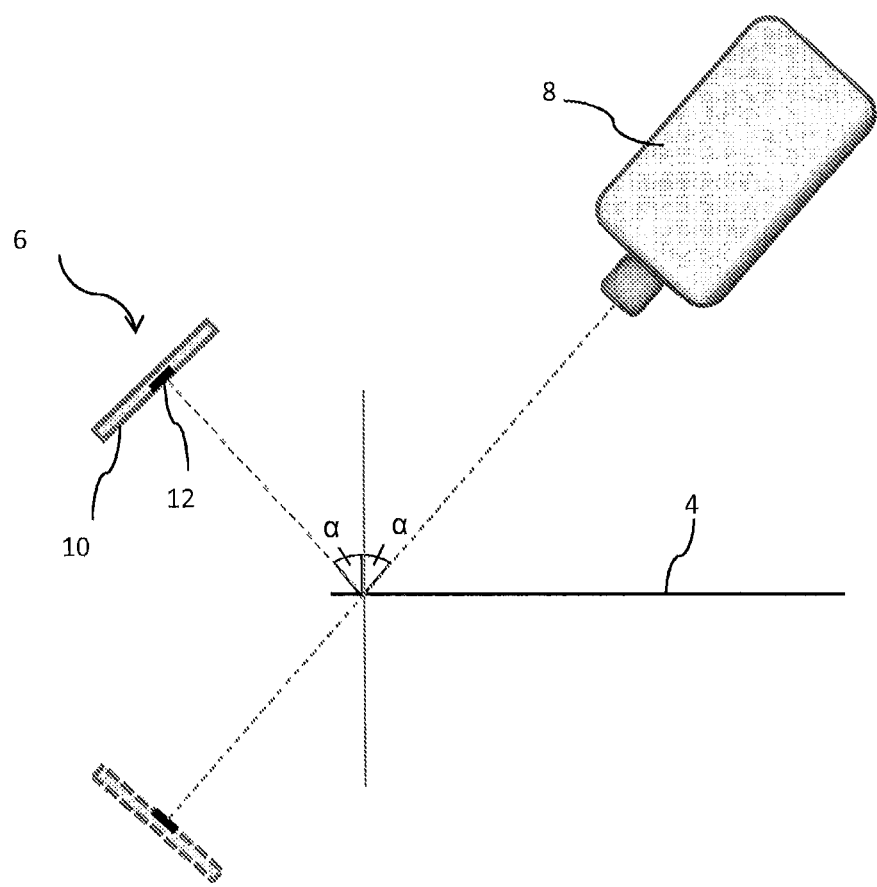
FIG. 3 is an analogous schematic to FIGS. 1 illustrating another embodiment with an illumination in reflection, for example for application to the case of a specular, untransparent substrate.

In reflection (see FIG. 3), the camera observes the image produced on the glass sheet after reflection from the surface of the glass sheet. Specifically, FIG. 3 illustrates a second embodiment in which the illumination and the camera are on the same side of the substrate. The camera and the illumination are arranged such that the camera observes the illumination level with its median dark zone, the illumination being analogous to that used in the first embodiment. The only difference is on account of the arrangement of the camera and the illumination.

Since it is a question of a linear camera, the image is reconstructed from a plurality of successive image captures. The field of observation of the camera on the glass sheet is that corresponding to a width of a pixel, since it is a question of a linear camera.

Preferably, the camera is focused on the glass sheet, preferably on the middle of the thickness of the glass sheet.

However, as a variant, the number of image captures is of any size suitable for forming an image in which the code is entirely visible.

Preferably, the device comprises an encoder connected to the camera in order to measure the movement of the glass sheet and the device is configured to trigger image captures by the camera depending on the progression of the glass sheet relative to the camera.

Once the image has been acquired, processing programs stored in the memory of the processor, for example on a permanent or removable medium, are implemented so that the processor processes the image acquired, and decodes the code.

The programs are able to deliver information present in the code.

This information for example comprises an identifier, but it is, as a variant, of any suitable type and may for example include the manufacturing site and date of manufacture.

Figure 4:
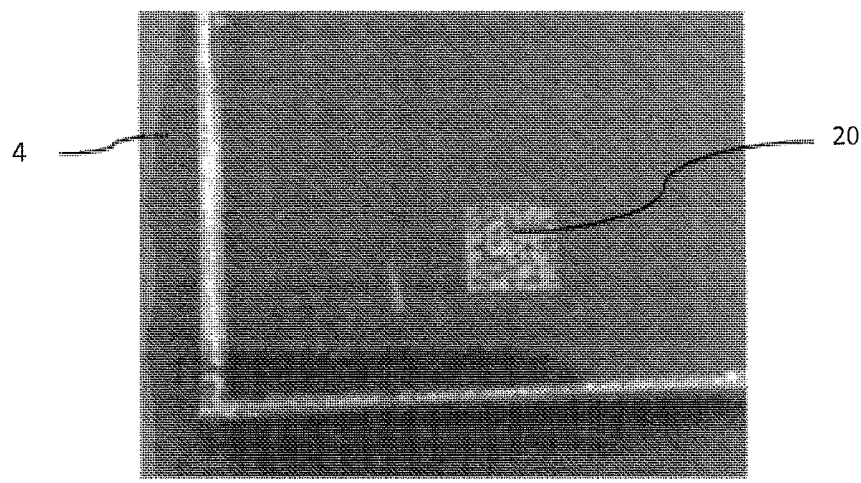

Each glass sheet 2 is marked with a symbol 20 forming a code. FIG. 4 illustrates a glass sheet marked with a symbol 20 of Data Matrix type.

Specifically, the symbol 20 is preferably two-dimensional and, for example, of the Data Matrix type.

The symbol 20 is for example marked immediately after the float glass ribbon has been cut into large glass sheets, or immediately before or even during the cutting. The glass sheet then has a width larger than 2 meters and a length larger than 5 meters.

It will be noted that the device may be used in a factory for manufacturing float glass or, for example, in a factory for transforming glass for the manufacture of architectural or automotive glazing units.

The glass sheet for example has a code on each of its two faces, for example on a respective side of the sheet, so that the code can be read whether the glass sheet be flipped or not. The depth of field enabled by the reading device is then very advantageous because it allows the code to be read in both cases.

Figure 5:
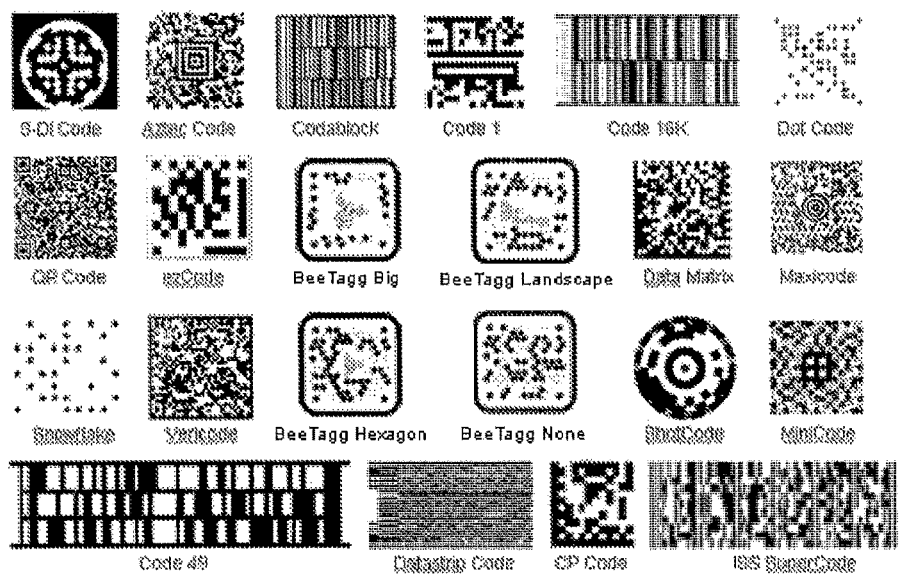

It will also be noted that the symbol may be of any suitable type and is not necessarily a Data Matrix. It may as a variant be a question of any type of suitable two-dimensional symbol. FIG. 5 illustrates other types of known codes, namely: 3-DI code, Aztex Code, Codablock, Code 1, Code 16K, Dot Code, QR Code, ezCode, BeeTagg Big, BeeTagg Landscape, Data Matrix, Maxicode, Snowflake, Vericode, BeeTagg Hexagon, BeeTagg None, ShotCode, MiniCode, Code 49, Datastrip Code, CP Code, and ISS SuperCode. As yet another variant, it is a question of an only one-dimensional symbol of the barcode type.

Generally, it is a question of a symbol forming a code of any suitable type.

To carry out the marking of the symbol, a 50 W $CO_2$ marking laser is for example used. By way of example, the laser is able to alter properties of the glass such as its color, its surface finish or its refractive index and thus form the symbol.

The apparatus is placed facing a main face of the glass sheet.

The glass sheets 2 for example have a thickness comprised between 0.5 and 19 mm and especially between 2 and 12 mm—between 4 and 8 mm for example. However, as a variant, the glass sheets may be any suitable thickness.

It is for example a question of soda-lime-silica glass but it may as a variant be any type of suitable glass.

Generally, it is a question of a glass sheet of any suitable type.

Furthermore, in the illustrated examples, the substrates comprise a single glass sheet. However, as a variant, a substrate comprises a plurality of glass sheets. It is for example a question of a laminated glazing unit comprising two glass sheets laminated together by way of an interlayer made of a thermoplastic such as PVB, or a glazing product such as a double glazing unit, or more generally a glazing product comprising a single or multiple glazing unit.

Furthermore, the glass sheets may be coated or printed with thin films. Specifically, by virtue of the contrast obtained with the reading device, it is possible to read codes even when they are on glass sheets coated with thin films.

The invention claimed is:

1. A device for reading a symbol forming a code marked on one face of a substrate comprising a glass sheet, the substrate being on the run, the device comprising:
    an illumination;
    a camera configured to acquire at least one image of at least one portion of the symbol, the running substrate being illuminated by the illumination; and
    a processor connected to the camera and configured to implement an image-processing step in which the acquired image is processed by the processor and decoded,
    wherein the camera is a linear camera and the illumination is a dark field illumination, and wherein the device is configured to carry out, prior to the processing step, a plurality of image acquisitions with the linear camera of various portions of the symbol.

2. The device as claimed in claim 1, wherein the illumination comprises two illuminating zones and a dark zone between the two illuminating zones, the linear camera observing the dark zone.

3. The device as claimed in claim 2, wherein the dark zone is obtained by masking a zone illuminated by the illumination.

4. The device as claimed in claim 1, wherein the illumination comprises a light source and a scattering element covering the light source so as to produce a diffuse light.

5. The device as claimed in claim 3, wherein the illumination comprises a light source and a scattering element covering the light source so as to produce a diffuse light and wherein an illuminating plane is perpendicular to an optical axis of the camera.

6. The device as claimed in claim 1, wherein the camera and the illumination are placed on either side of the substrate, the substrate being transparent.

7. The device as claimed in claim 1, wherein the camera and the illumination are placed on a same side of the substrate, the substrate having a specular surface.

8. The device as claimed in claim 1, comprising an apparatus for measuring a movement of the substrate, the device being configured so that the acquisition of the images of the substrate by the linear camera is triggered depending on the measured movement.

9. The device as claimed in claim 1, wherein the symbol is readable and decodable in a position ranging from 0 mm to 10 mm from a focal plane of the camera.

10. The device as claimed in claim 1, wherein a field of view of the camera is not parallel to a run direction of the substrate.

11. The device as claimed in claim 10, wherein the field of view of the camera is perpendicular to the run direction of the substrate.

12. The device as claimed in claim 1, wherein a width of a field of view of the camera is at least 30 mm.

13. A method for reading a symbol forming a code marked on one face of a substrate comprising a glass sheet, the substrate being on the run, the method comprising:
    performing at least one acquisition, with a camera, of an image of at least one portion of the symbol, the running substrate being illuminated by an illumination; and
    performing an image-processing step in which the acquired image is processed by a processor and decoded,
    wherein the camera is a linear camera and the illumination is a dark field illumination and, prior to the processing step, a plurality of acquisitions of images of various portions of the symbol are carried out with the linear camera, wherein the method is carried with a reading device as claimed in claim 1.

14. The method of claim 13, wherein the code comprises an identifying code and wherein the image-processing step comprises decoding the identifying code.

15. The method of claim 13, wherein the substrate is transparent.

16. The device as claimed in claim 1, wherein the substrate is transparent.

17. The device as claimed in claim 1, wherein the code comprises an identifying code and wherein the processor is configured to decode the identifying code to identify the substrate.

18. A method for reading a symbol forming a code marked on one face of a substrate comprising a glass sheet, the substrate being on the run, the method comprising:
    performing at least one acquisition, with a camera, of an image of at least one portion of the symbol, the running substrate being illuminated by an illumination; and performing an image-processing step in which the acquired image is processed by a processor and decoded, wherein the camera is a linear camera and the illumination is a dark field illumination and, prior to the processing step, a plurality of acquisitions of images of various portions of the symbol are carried out with the linear camera.

19. The method of claim 18, wherein the code comprises an identifying code and wherein the image-processing step comprises decoding the identifying code.

20. The method of claim 18, wherein the substrate is transparent.

\* \* \* \* \*